(12) United States Patent
Vogt

(10) Patent No.: US 9,912,218 B2
(45) Date of Patent: Mar. 6, 2018

(54) POTENTIAL DEFINITION OF INPUT LINES OF AN INVERTER

(71) Applicant: SMA Solar Technology AG, Niestetal (DE)

(72) Inventor: Wilfried Vogt, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 588 days.

(21) Appl. No.: 14/182,897

(22) Filed: Feb. 18, 2014

(65) Prior Publication Data

US 2014/0159504 A1 Jun. 12, 2014

Related U.S. Application Data

(63) Continuation of application No. PCT/EP2012/065118, filed on Aug. 2, 2012.

(30) Foreign Application Priority Data

Aug. 19, 2011 (DE) .................. 10 2011 052 849

(51) Int. Cl.
- H02M 3/06 (2006.01)
- H02M 1/00 (2006.01)
- H02J 3/38 (2006.01)
- H02M 7/48 (2007.01)

(52) U.S. Cl.
CPC .............. *H02M 1/00* (2013.01); *H02J 3/383* (2013.01); *H02M 7/48* (2013.01); *Y02E 10/563* (2013.01)

(58) Field of Classification Search
CPC . H02M 1/00; H02M 7/48; H02J 3/383; Y02E 10/563

USPC ......................................................... 307/109
See application file for complete search history.

(56) References Cited

U.S. PATENT DOCUMENTS

| 5,999,423 A | 12/1999 | Steinke, et al. |
| 7,616,467 B2 | 11/2009 | Mallwitz |
| 2006/0152085 A1* | 7/2006 | Flett .................. B60L 9/30 307/75 |

(Continued)

FOREIGN PATENT DOCUMENTS

| DE | 202006008936 U1 | 8/2006 |
| EP | 0899859 A2 | 3/1999 |

(Continued)

OTHER PUBLICATIONS

Authors: Hirofumi Akagi; Hiroshi Hasegawa; and Takafumi Doumoto Title: Design and performance of a passive EMI filter for use with a voltage-source PWM inverter having sinusoidal output voltage and zero common-mode voltage; Date Jul. 2004; Publisher: IEEE; vol. 19, No. 4; Pertinent pp. 1069-1076.*

(Continued)

*Primary Examiner* — Richard Tan
(74) *Attorney, Agent, or Firm* — Eschweiler & Potashnik, LLC

(57) ABSTRACT

For defining an electric potential of input lines of an inverter with respect to ground, in all current-carrying output lines of the inverter capacitors are arranged and charged to a DC voltage in order to shift the electric potential of the input lines with respect to a reference potential present at the current-carrying output lines of the inverter by this DC voltage.

19 Claims, 3 Drawing Sheets

(56) References Cited

U.S. PATENT DOCUMENTS

| | | | |
|---|---|---|---|
| 2008/0266919 A1* | 10/2008 | Mallwitz | H02M 3/158 363/124 |
| 2009/0034304 A1* | 2/2009 | Engel | H02M 3/158 363/71 |
| 2010/0008105 A1 | 1/2010 | Mallwitz, et al. | |
| 2010/0110742 A1* | 5/2010 | West | H02H 3/16 363/132 |
| 2012/0120694 A1* | 5/2012 | Tsuchiya | H01L 31/02021 363/97 |

FOREIGN PATENT DOCUMENTS

| | | | |
|---|---|---|---|
| EP | 1971018 A1 | | 9/2008 |
| WO | 2010069620 A1 | | 6/2010 |
| WO | WO2011024374 | * | 3/2011 |

OTHER PUBLICATIONS

Klumpner, C., et al. "A More Efficient Current Source Inverter with Series Connected AC Capacitors for Photovoltaik and Fuel Cell Applications" Proceedings PCIM Europe 2009 Conference, Seiten 153 bis 158, ISBN: 978-3-8007-3158-9. Published in 2009.
International Search Report dated Nov. 14, 2013 for International application No. PCT/EP2012/065118. 2 Pages.

* cited by examiner

POTENTIAL DEFINITION OF INPUT LINES OF AN INVERTER

REFERENCE TO RELATED APPLICATIONS

This application is a continuation of International application number PCT/EP2012/065118, filed on Aug. 2, 2012, which claims priority to German application number 10 2011 052 849.0, filed on Aug. 19, 2011.

FIELD

The disclosure relates to a method of defining an electric potential of input lines of an inverter with respect to ground and to an inverter comprising input lines for connection to a DC current source, output lines for outputting an AC current and devices for defining an electric potential of the input lines with respect to ground.

Particularly, the present disclosure belongs to the technical field of feeding electric power from a photovoltaic generator into an AC power grid. The AC power grid may particularly be a public power grid but also an island grid. Depending on the structure of the modules of the photovoltaic generator, it may be advantageous or even required for a long lifetime to keep the entire photovoltaic generator on positive or negative electrical potential with respect to ground in order to avoid negative or positive voltages of the modules with respect to their environment. This applies particularly to so-called thin film modules.

BACKGROUND

As a known measure for protecting so-called thin film modules against so-called TCO corrosion it is described in the document DE 20 2006 008 936 U1 to ground the negative connection terminal of a photovoltaic generator, or to connect it to the neutral conductor of a connected AC power grid, such that the solar modules may not have a negative electric potential with respect to ground and thus with respect to their environment. The disclosure in the document DE 20 2006 008 936 U1 is described as to even raise the negative connection terminal of the photovoltaic generator to a positive potential with respect to ground. For this purpose, a bias voltage source shall be arranged in a bypass line between the neutral or protective conductor of the AC power grid and the negative connection terminal of the photovoltaic generator. Both the direct connection of the negative connection terminal of a photovoltaic generator to the neutral conductor of an AC power grid and the in-between-arrangement of a bias voltage source that raises the negative connection terminal to a positive potential with respect to the neutral conductor requires an inverter with galvanic separation between the photovoltaic generator and the AC power grid.

It is known that inverters may comprise a transformer for galvanic separation. If this transformer is provided for AC current that is output at grid frequency and for transferring a higher electric power, it is a large and particularly heavy, as well as expensive component. Thus, often HF transformers as parts of DC/DC converters are used for galvanic separation. In this case the transformers themselves may be smaller. However, additional switching effort has to be spent.

A transformerless inverter comprising a DC/DC converter that is connected to the input side of an inverter bridge is known from the documents WO 2010/069620 A1 and US 2010/0008105 A1, which belong to the same patent family. The DC/DC converter comprises series resonant circuits with resonance capacitances that provide for a galvanic separation between the input lines of the inverter and the input lines of the inverter bridge. In this way, it is possible for a photovoltaic generator connected to the input lines of the inverter to select the potential with respect to ground freely by connecting any point of the photovoltaic generator in an electrically conductive way to ground or to a reference potential defined with respect to ground. Although no transformer is required for this purpose, nevertheless the additional DC/DC converter at the input side of the inverter bridge is needed. Due to selecting the potential of the photovoltaic generator, the resonant capacitances will be charged to a DC voltage, which is, however, not mentioned in the documents.

An inverter that has input lines provided for connection of a photovoltaic generator and that lead directly to an inverter bridge is known from Klumpner, C., et al. "A More Efficient Current Source Inverter with Series Connected AC Capacitors for Photovoltaik and Fuel Cell Applications" Proceedings PCIM Europe 2009 Conference, pages 153 to 158, ISBN: 978-3-8007-3158-9. Capacitors are arranged in the output lines of the inverter bridge. However, it is not intended to charge these capacitors to a DC voltage. The document does not at all concern the definition of an electric potential of the input lines of the inverter bridge and thus of the connected photovoltaic generator with respect to ground.

SUMMARY

The disclosure provides a method of defining an electric potential of input lines of an inverter with respect to ground and an inverter comprising input lines for connection to a DC current source, output lines for outputting an AC current and devices for defining an electric potential of the input lines with respect to ground, by which the definition of the electric potential of the input lines with respect to ground is possible at low efforts, preferably independent of the construction of the inverter.

In the new method of defining an electric potential of input lines of an inverter with respect to ground, capacitors are arranged in all current-carrying output lines of the inverter and charged to a DC voltage. As a result, the electric potential of the input lines of the inverter is shifted by this DC voltage with respect to a reference potential present at one of the current-carrying output lines of the inverter. This applies as long as the inverter does not have a galvanic separation between its input lines and its output lines. By means of this shift, the electric potential of one of the input lines of the inverter may be adjusted to a desired value. The potential of the other input lines differs by the voltage of a DC current source connected to the input lines and is insofar also defined with respect to ground.

In one embodiment the capacitors in the output lines of the inverter are all charged to the same DC voltage. Such a uniform charging of the capacitors normally also takes place automatically if only one of the capacitors in one of the current-carrying output lines of the inverter is charged.

In practice, the capacitors may be charged via a charging line that leads from a point downstream of one of the capacitors in one of the output lines up to a point upstream of this capacitor and that is electrically conductive only during charging. This may include applying the DC voltage for the charging process with a voltage source directly across the capacitor.

Even without a voltage source the charging may be effected, if the charging line leads from a point downstream of the capacitor in the output line connected to a neutral conductor up to the input line the electric potential of which is to be defined with respect to ground, wherein a diode is arranged in the charging line. A current loading the capacitor in the output line connected to the neutral conductor flows through the diode until the electric potential of the respective input line no longer falls below the potential of the neutral conductor as a reference potential or until the electric potential of the respective input line no longer increases above this reference potential, depending on the conducting direction of the diode.

The capacitors may also be charged via a charging line that leads from a point downstream of the capacitor in the output line connected to the neutral conductor up to an intermediate point of a voltage divider between the input lines and that is electrically conductive only during charging. For example, a diode may be arranged in the charging line. In this case, current flows through the diode until the electric potential of this intermediate point—depending on the conducting direction of the diode—is no longer below or above the potential of the neutral conductor, respectively.

Instead of arranging the charging line from a point downstream of one of the capacitors in one of the output lines up to a point upstream of this capacitor, i.e., across one of the capacitors in one of the output lines, the charging line may also be arranged from ground to a point upstream of one of the capacitors in one of the output lines. For this purpose, the charging line that is electrically conductive only during charging has to be connected, for example, to a ground conductor of the AC power grid or in any other way to ground. In this way, the electric potential of the input line is defined directly with respect to ground even if the respective neutral conductor of the AC power grid is not fixed to ground potential. However, the currents during charging the capacitors in the output lines of the inverter according to the present disclosure directly flow towards ground then, which may eventually not be acceptable or not desired, as it may, for example, trigger a residual current monitoring device of the inverter. In this case it is preferred to connect the charging line to this neutral conductor, even if a neutral conductor of the AC power grid connected to the inverter is not directly fixed to ground potential.

In order to avoid an excessive current flowing through the diode in the charging line during startup, a resistor, which is then connected in series with the diode, may be arranged in the charging line. Generally, an inductor or any other component may also limit the current through the charging line.

Additionally, a voltage source, which is then also connected in series with the diode, may be arranged in the charging line in order to systematically shift the potential of the connected input line further with respect to the reference potential by the voltage of the voltage source. Thus, the potential of a connected photovoltaic generator may, for example, be increased or decreased entirely with respect to ground by this voltage. The internal resistance of the voltage source may then make a further resistor for current limitation in the charging line unnecessary.

Independent of the way of charging the capacitors in the output lines of the inverter, in one embodiment these capacitors are all charged to such a high DC voltage that, during operation of the inverter, the electric potentials of both or all input lines of the inverter always have one and the same sign with respect to ground. The DC voltage across the capacitors may also be selected that high that a certain minimum voltage difference with respect to ground is kept at the input lines.

As already indicated, the method according to the disclosure is particularly suited for application in inverters that do not have a galvanic separation. The input lines of such inverters can generally not be grounded. By means of the method according to the disclosure, however, a definition of the electric potential of the input lines with respect to ground can be achieved easily.

In practice, in the new method the input lines and the output lines of the inverter may be connected directly to one and the same inverter bridge. Correspondingly, the inverter may have an extremely simple construction, i.e., it may essentially consist only of the inverter bridge.

The method according to the disclosure is not limited to a certain number of phases of the inverter. Rather, the inverter may either comprise one or two or three or even more phases. The capacitors then have to be provided in all current-carrying output lines, i.e., usually in all output lines except of potential ground (PE). Further, for inverters the neutral line of which is used only for measuring purposes, a capacitor in this line can normally be omitted.

For the method according to the disclosure, the capacitors that are charged to a DC voltage are arranged in the output lines of the inverter which are connected to the AC power grid to feed an AC current into the AC power grid. In particular, these capacitors are not any resonant capacitances of series resonant circuits that are arranged upstream of the feeding inverter. The galvanic separation between the input lines, which are connected to the DC voltage source, and the output lines, which are connected to the AC power grid, caused by such resonance capacitances would on the contrary result in that charging capacitors in these output lines would just not have the result of the desired potential definition of the input lines.

In an inverter according to the disclosure comprising input lines for connection to a DC current source, output lines for outputting an AC current and devices for defining an electric potential of the input lines with respect to ground, these devices include capacitors arranged in all current-carrying output lines of the inverter and a charging device that charges the capacitors to a DC voltage in order to shift the electric potential of the input lines with respect to a reference potential present at the current-carrying output lines of the inverter by this DC voltage, without predefining the potential by a permanently electrically conductive connection.

The charging device comprises a charging line that leads to a point upstream of one of the capacitors in one of the output lines and in which a switching element is arranged that is electrically conductive only during charging.

It goes without saying that the capacitors provided in the output lines of the inverter according to the disclosure provide a galvanic separation between points of the respective output lines upstream of the capacitors and downstream of the capacitors. This galvanic separation, however, is not preserved when the capacitors are charged via a charging line that leads from a point downstream of one of the capacitors in one of the output lines to a point upstream of this capacitor. Even though the switching element that is electrically conductive only during charging is arranged in this charging line, it hinders a permanent galvanic separation. The galvanic separation, however, is preserved, if the charging line leads from ground, for example, to one of the input lines or to an intermediate point of a voltage divider between the input lines.

The devices of the inverter according to the disclosure defining the electric potential of the input lines of the inverter according to the disclosure may be arranged in a separate housing comprising own connection terminals or in a common housing with common connection terminals together with a DC/AC converter of the inverter. Whereas the latter variant, in which the entire inverter is accommodated in one housing, may particularly be desirable for manufacturing new inverters according to the disclosure, the former variant may have advantages in retrofitting existing inverters in accordance with the disclosure.

With regard to details of the inverter according to one embodiment of the disclosure, it is referred to the description of the method according to the disclosure.

The inverter according to the disclosure is advantageously used for feeding electric power from a photovoltaic generator into an AC power grid, particularly from a photovoltaic generator with thin film modules, which are sensitive to certain electric potentials with respect to ground or their environment, respectively.

Advantageous developments of the disclosure result from the claims, the description and the drawings. The advantages of features and of combinations of a plurality of features mentioned at the beginning of the description only serve as examples and may be used alternatively or cumulatively without the necessity of all embodiments according to the disclosure having to obtain these advantages. Further features may be extracted from the drawings. The combination of features of different embodiments of the disclosure or of features of different claims is also possible, and it is motivated herewith. This also relates to features that are illustrated in separate drawings, or that are mentioned when describing them. These features may also be combined with features of different claims. Likewise, individual features listed in one of the independent claims may be omitted in further embodiments of the disclosure.

BRIEF DESCRIPTION OF THE FIGURES

In the following, the disclosure is further explained and described by means of exemplary embodiments and with reference to the attached drawings.

DETAILED DESCRIPTION

Figure 1:
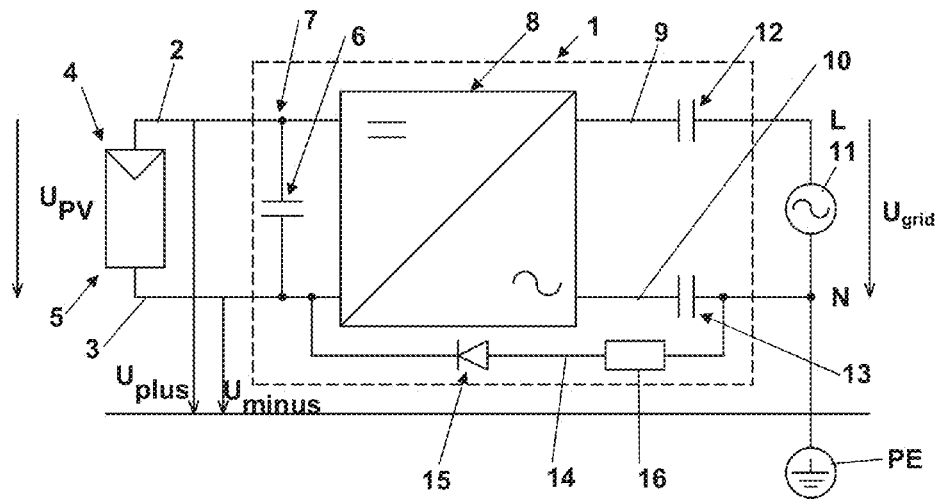
FIG. 1 illustrates the implementation of the method according to the disclosure in a single-phase inverter and a resulting inverter according to the disclosure, respectively.

The inverter 1 depicted in FIG. 1 comprises two input lines 2 and 3, which are connected to a DC current source 4, here in form of a photovoltaic generator 5. A buffer capacitor 6 between the input lines 2 and 3 forms a DC voltage link 7, which stabilizes the voltage $U_{PV}$ of the photovoltaic generator 5 between the input lines 2 and 3. As known, the buffer capacitor 6 may also be set up by a plurality of separate buffer capacitors. Downstream of the DC voltage link 7, the input lines 2 and 3 are connected to a DC/AC converter 8. Output lines 9 and 10 starting at the DC/AC converter 8 are connected to an AC power grid 11. Actually, the output line 9 is connected to the line conductor L and the output line 10 is connected to the neutral conductor N of the AC power grid 11. Between the DC/AC converter 8 and the AC power grid 11, a capacitor 12 or 13, respectively, is provided in each of the output lines 9 and 10. During operation of the inverter 1, a DC voltage is applied to these two capacitors 12 and 13, which is superimposed with the AC grid voltage $U_{grid}$ at the capacitor 12. Due to the DC voltage across the capacitors 12 and 13, the electric potential of the input lines 2 and 3 is shifted with respect to ground potential PE. Thus, for example, the electric potential of the input line 3, which is lower than the electric potential of the input line 2 by the voltage $U_{PV}$, can be raised to such an extent that the electric potential never gets negative, particularly despite the variations caused by the AC voltage $U_{grid}$. Charging the capacitors 12 and 13 is provided here via the charging line 14, which connects the input line 3 to the grid side of the capacitor 13 and in which a diode 15 is provided. The conducting direction of the diode 15 is from the neutral conductor of the AC power grid 11 to the input line 3. Thus, current flows through the diode 15 until the DC voltage across the capacitors 12 and 13 has increased to such an extent that the minimum electric potential of the input line 3 no longer falls below ground potential PE. A resistor 16 in the charging line 14 avoids an excessive current flow through the diode 15 during start up of the inverter 1, i.e., when the DC voltage across the capacitors 12 and 13 is still zero. A dashed line in FIG. 1 indicates that all components of the inverter 1, including the DC/AC converter 8, the buffer capacitor 6 and the devices 12 to 16 for defining the electric potential of the input lines 2 and 3 with respect to ground may be accommodated in a common housing with common connection terminals towards the outside.

Figure 2:
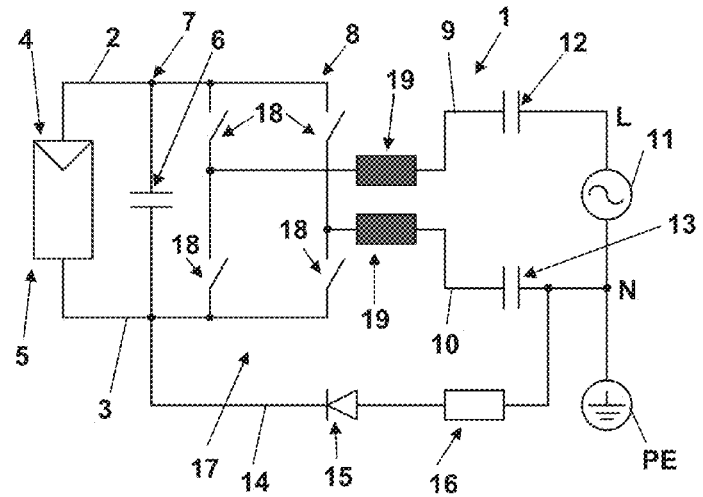
FIG. 2 illustrates a practical embodiment of the inverter of the present disclosure according to FIG. 1.

FIG. 2 shows the realization of the DC/AC converter 8 by means of an H-bridge 17 comprising four switches 18 and two output side inductors 19. The switches 18 are frequently, but not necessarily, semiconductor power switches with inherent anti-parallel diodes in a usual arrangement (not depicted). The switches 18 of the H-bridge 17 are pulsed in a way that is usual as such, i.e., they are at least partially operated at a high frequency for current forming. During operation of the inverter 1, the output lines 9 and 10 are alternately and temporarily connected to the input lines 2 and 3 via the switches 18. With regard to the line conductor and the neutral conductor of the AC power grid 11, this galvanic connection is interrupted by the capacitors 12 and 13 insofar that the potential of the input lines 2 and 3 may be shifted with respect to the output potential at the output lines 9 and 10. Due to the charging line 14, however, there is no galvanic separation between the input lines 2 and 3 and the output lines 9 and 10, as it is requested in the US-regulations, for example.

Figure 3:
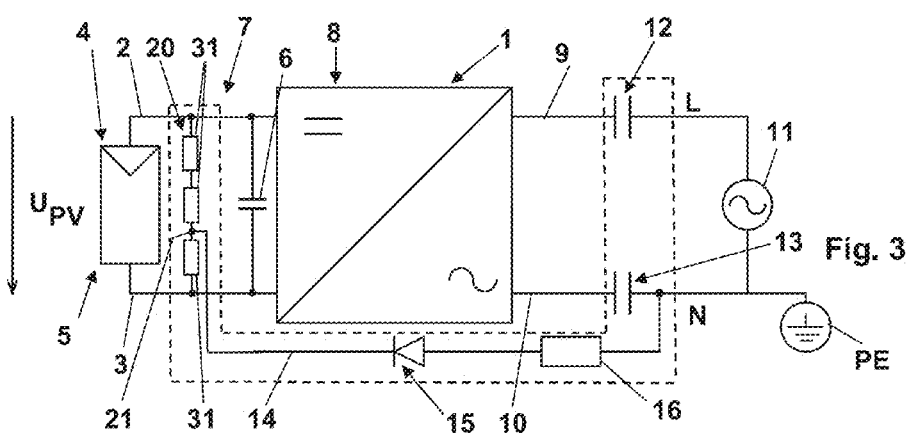
FIG. 3 illustrates a further embodiment of the method of the disclosure in a single-phase inverter and the resulting inverter of the disclosure.

In the embodiment of the inverter 1 according to FIG. 3, besides the buffer capacitor 6, a voltage divider 20 for the voltage $U_{PV}$ of the DC voltage source 4 is formed by resistors 31 in the DC voltage link 7. In this case, the charging line 14 leads to an intermediate point 21 of the voltage divider 20. Correspondingly, the capacitors 12 and 13 are charged here via the charging line 14 such that the electric potential of this intermediate point 21 does not fall below PE. Additionally, a dashed line in FIG. 3 indicates that the devices 12 to 16 and 20 for defining the electric potential of the input lines 2 and 3 with respect to the reference potential of the neutral conductor N may also be accommodated in a separate housing with separate connection terminals for the input lines 2 and 3 and for the output lines 9 and 10.

Figure 4:
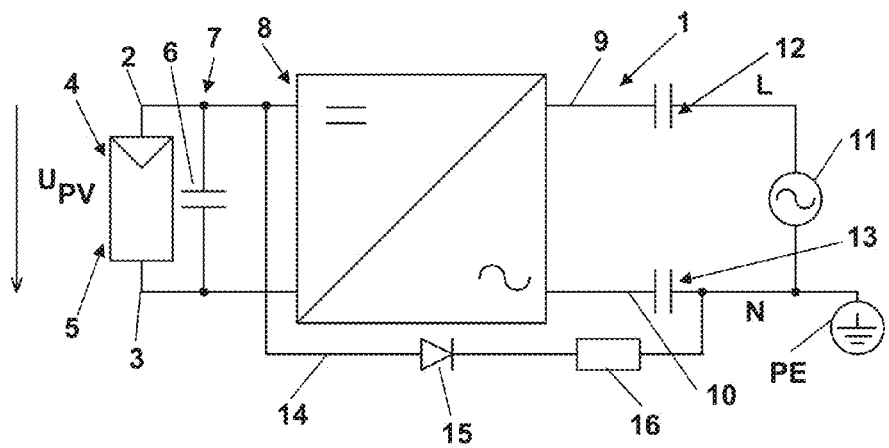
FIG. 4 illustrates still a further embodiment of the method of the disclosure in a single-phase inverter and the resulting inverter of the disclosure.

In the embodiment of the inverter 1 according to FIG. 4, the input line 2, which is on a higher electric potential than the input line 3, is connected to the charging line 14. Here, the diode 15 has a conducting direction that is inverted as compared to FIGS. 1 to 3. As a result, the DC voltage up to which the capacitors 12 and 13 are charged has an inverted sign as compared to the embodiments according to FIGS. 1 to 3 and gets that high that the electric potential at the input lines and thus at any point of the photovoltaic generator 5 does not exceed ground potential PE, i.e., that the potential with respect to ground is always negative.

Figure 5:
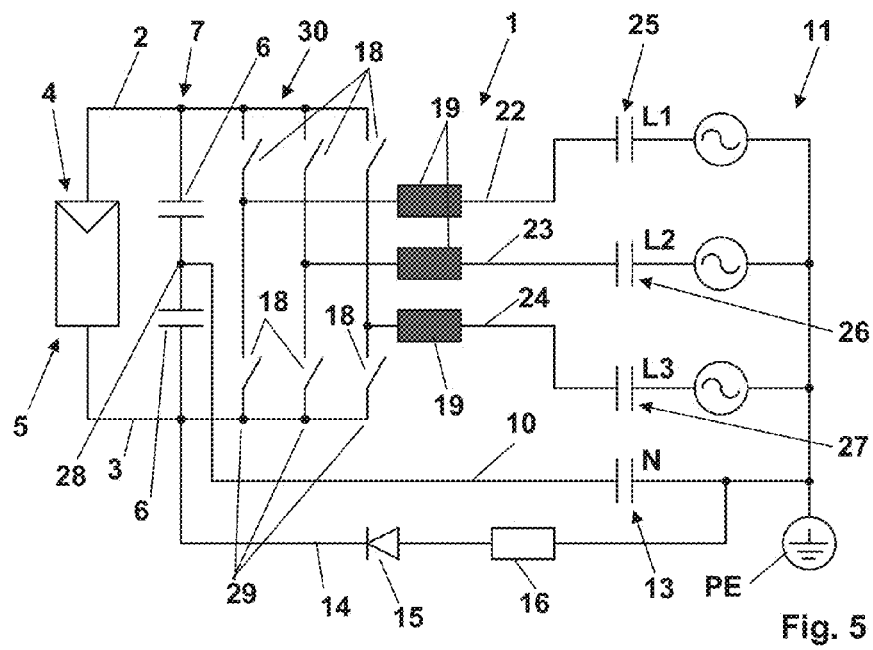
FIG. 5 illustrates a possible configuration of a three-phase inverter according to the disclosure.

FIG. 5 outlines a three-phase embodiment of the inverter 1 having three output lines 22, 23 and 24 to the line conductors L1, L2 and L3 of the AC power grid 11, which is a three-phase AC power grid 11 here, besides the output line 10 to the neutral conductor N. Correspondingly, a total of four capacitors 13 and 25 to 27 are provided in the current-carrying output lines 10 and 22 to 24, here. The output line 10 leads from a center point 28 of a DC voltage link 7 between the input lines 2 and 3, formed here by two buffer capacitors 6, to the capacitor 13. The output lines 22 to 24 are each connected to half bridges 29 with the switches 18 and the inductors 19 of an inverter bridge 30. This corresponds to the usual design of a simple three-phase inverter bridge 30. The charging line 14 is again connected to the neutral conductor and connects it to the input line 3 via the diode 15. From the circuitry according to FIG. 5 it becomes evident that the DC voltage to which the capacitor 13 and the other capacitors 25 to 27 are charged is generally as high as a DC voltage across the buffer capacitor 6 located between the center point 28 and the input line 3. Just by this, a shift of the electric potential of the input line 3 with respect to PE is achieved for which the electric potential of the input line 3 never falls below PE and, thus, no point of the photovoltaic generator 5 ever has a negative electric potential with respect to the environment of the photovoltaic generator 5.

If the neutral conductor N is mainly provided for measurement purposes and safety purposes, i.e., if, in contrary to FIG. 5, it is not a current-carrying line, the capacitor 13 in the output line 10 to the neutral conductor N is optional.

Figure 6:
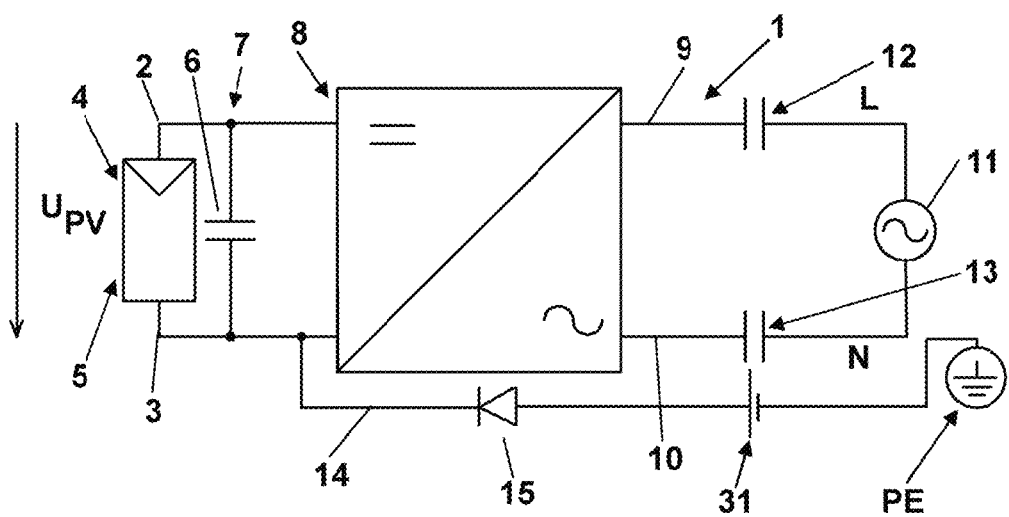
FIG. 6 illustrates still a further embodiment of the method of the disclosure for in a single-phase inverter that feeds into a TT-grid in this case, and the resulting inverter of the disclosure.

In the inverter 1 according to FIG. 6 it is shown that it feeds into an AC power grid 11 in which the neutral conductor N is not connected to ground PE but in which nevertheless a connection to ground PE is available, which is, for example, needed to ground a housing of the inverter 1. Then the loading line 14 may also lead from ground PE to one of the input lines or to an intermediate point arranged in between, here to the input line 3. Further, it is shown in FIG. 6 that a voltage source 31 may be provided instead of a resistor 16, as shown in FIGS. 1-5, in the charging line 14 in order to increase the potential of the input line with respect to ground to a level defined by the voltage source 31. However, even with an AC power grid 11 in which the neutral conductor N has no direct connection to ground, like for example in a so-called TT-grid, it is often reasonable to provide the charging line 14 starting from the neutral conductor N in order to avoid that currents flow towards ground PE. The voltage source 31 may also be provided in such a charging line 14 connected to the neutral conductor N.

The invention claimed is:

1. A method of defining an electric potential of input lines of an inverter with respect to ground, comprising:
in all current-carrying output lines of the inverter, arranging and charging capacitors to a DC voltage via a charging line that is connected to a neutral conductor and leads from a first point of the neutral conductor downstream of a capacitor of the capacitors that is connected in series to a current-carrying output line of the current-carrying output lines leading to the neutral conductor, and connected to a second point that is upstream of the capacitor to an input line of the input lines or to an intermediate point of a voltage divider between the input lines; and
shifting the electric potential of the input lines with respect to a reference potential at one of the current-carrying output lines of the inverter by the DC voltage.

2. The method of claim 1, wherein the capacitors are all charged to the same DC voltage.

3. The method of claim 1, wherein the charging line is electrically conductive only during charging.

4. The method of claim 3, wherein a diode is arranged in the charging line as a switching element that is directly connected to the second point.

5. The method of claim 3, wherein the charging line further comprises at least one of a resistor or a voltage source connected in series with a switching element that is electrically conductive only during charging.

6. The method of claim 1, wherein the charging line comprises at least one of: a resistor or a voltage source connected in series with a switching element that is electrically conductive only during charging.

7. The method of claim 1, wherein the capacitors are all charged to the DC voltage at a level that the electric potential of the input lines with respect to ground comprises a same sign during operation of the inverter.

8. The method of claim 1, wherein the output lines are connected to the input lines during operation of the inverter.

9. The method of claim 1, wherein the output lines are connected to an AC power grid in order to feed AC current into the AC power grid.

10. An inverter comprising:
input lines for connection to a DC current source;
output lines for outputting an AC current; and
devices for defining an electric potential of the input lines with respect to a ground, wherein the devices include capacitors arranged in all current-carrying output lines of the inverter, and a charging device that charges the capacitors to a DC voltage in order to shift the electric potential of the input lines with respect to a reference potential present at the current-carrying output lines of the inverter by the DC voltage without predefining the electric potential by a permanently electrically conductive connection;
wherein the charging device comprises a charging line connected to a neutral conductor and leading from a first point of the neutral conductor that is downstream of a capacitor of the capacitors that is connected in series to a current-carrying output line of the current-carrying output lines leading to the neutral conductor, and to a second point that is upstream of the capacitor to an input line of the input lines or to an intermediate point of a voltage divider between the input lines.

11. The inverter of claim 10, wherein the charging line comprises a switching element that is configured to be electrically conductive only during charging.

12. The inverter of claim 11, wherein the charging line comprises a diode as the switching element that is directly connected to the second point.

13. The inverter of claim 11, wherein the charging line further comprises at least one of: a resistor or a voltage source connected in series with the switching element.

14. The inverter of claim 10, wherein the charging line comprises at least one of: a resistor or a voltage source connected in series with a switching element.

15. The inverter of claim 10, further comprising switches that connect the output lines to the input lines.

16. The inverter of claim 10, wherein the input lines and the output lines are connected to an inverter bridge.

17. The inverter of claim 10, wherein the devices for defining the electric potential of the input lines are provided in a separate housing with separate connection terminals or together with a DC/AC converter of the inverter in a common housing with common connection terminals.

18. The inverter of claim 10, wherein the output lines are provided for connection to an AC power grid in order to feed AC current into the AC power grid.

19. The inverter of claim 10, further comprising a photovoltaic generator comprising thin film modules configured to feed power into the input lines, and into an AC power grid via the output lines.

\* \* \* \* \*